United States Patent [19]

Dees

[11] 3,801,134
[45] Apr. 2, 1974

[54] MULTI-HITCH ELEMENT TOW HITCH CONSTRUCTION

[76] Inventor: Donald E. Dees, Box 133, Coello, Ill. 62825

[22] Filed: July 26, 1972

[21] Appl. No.: 275,262

[52] U.S. Cl. .............................. 280/415 A, 280/495
[51] Int. Cl. ............................................ B62d 53/00
[58] Field of Search ............ 280/415 R, 415 A, 417, 280/502, 482, 491, 492, 493, 494, 495, 498

[56] References Cited
UNITED STATES PATENTS

| 2,911,233 | 11/1958 | Riddle | 280/415 A R |
| 2,838,327 | 6/1958 | Collins | 280/491 A R |
| 2,827,307 | 3/1958 | Osborn | 280/417 R |
| 2,671,674 | 3/1954 | Derksen | 280/491 A R |
| 2,583,191 | 1/1952 | Voorhees | 280/494 R |

Primary Examiner—Leo Friaglia
Assistant Examiner—Randall A. Schrecengost
Attorney, Agent, or Firm—Clarence A. O'Brien; Harvey B. Jacobson

[57] ABSTRACT

Hitching and towing means for use when operatively coupling and interconnecting a powered draft vehicle, a truck or tractor for example, to a complemental drawn vehicle, a trailer, wagon, farming implement or the like. The disclosed hitch construction comprises a relatively stationary outer sleeve which constitutes a housing, the bore of said housing providing a bearing. Complemental mounting means for said outer sleeve is fixed atop said sleeve and embodies a fixed upstanding screw-threaded anchoring stud, more particularly, a stud having a stud securing nut mounted thereon. An inner relatively movable sleeve is housed in said outer sleeve and journaled for rotation in the bearing. The inner sleeve has means at its respective leading and trailing end portions cooperatively orienting and assembling both sleeves for coordinate use. Hitching means is operatively carried by the trailing end of the inner sleeve for hooking up and towing a trailer, wagon, a farming implement, or the like.

5 Claims, 5 Drawing Figures

PATENTED APR 2 1974  3,801,134

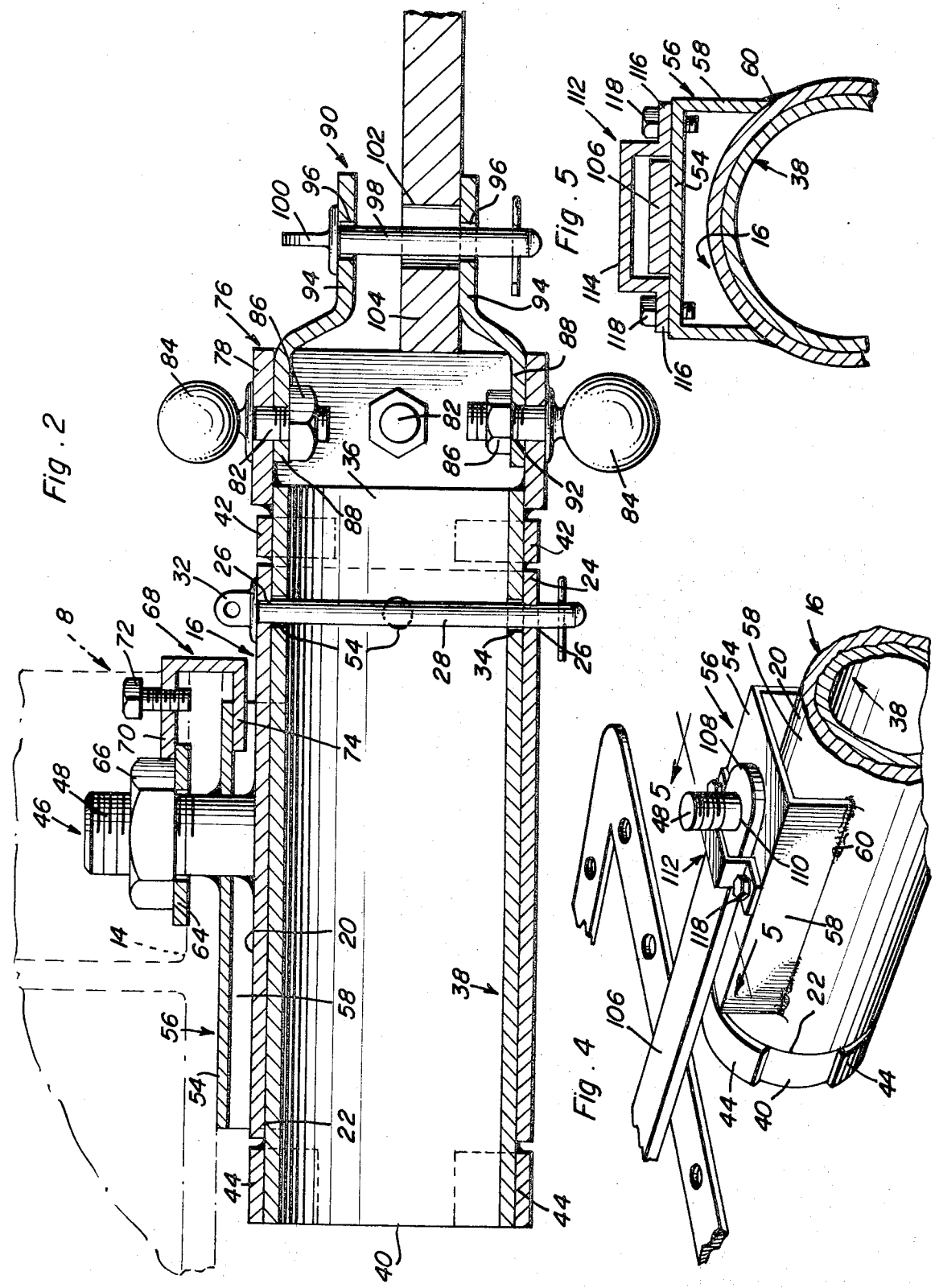

MULTI-HITCH ELEMENT TOW HITCH CONSTRUCTION

This invention relates, broadly stated, to vehicle hitching and towing means and pertains, more specifically stated, to a structurally unique device which lends itself to practical and convenient use when one is called upon to operatively couple a powered draft vehicle, a truck or tractor for example, to a drawn vehicle, that is, a trailer, wagon, farming implement, or the like.

More specifically the inner sleeve is snug-fitted in the bore or bearing of the outer sleeve but is capable of being manually rotated within the encompassing confines of said bearing and is provided forwardly of the trailing end with a plurality of spaced keeper pin holes. The outer sleeve is provided with at least one keeper pin hole with which the spaced keeper pin holes are capable of being manually aligned at will. A readily accessible bodily applicable and removable indexing or indicating keeper pin passes downwardly through the single keeper pin hole and then through a selected one of the spaced keeper pin holes above stated.

For general background information attention is directed to U.S. Pat. No. 2,872,213, granted to Lawrence A. Hosford and pertaining to a trailer hitch which can be quickly and easily adapted to join with either of the two sizes of sockets which are said to be standard on trailers to be towed by powered automobiles or vehicles. A similar but structurally different ball hitch construction which provides a plurality of hitching balls of different diameters and heights is shown in U.S. Pat. No. 2,911,233, granted to Harry V. Riddle. Many and structurally varying tractor and trailer hitches are known but need not herein be set forth with particularity.

In carrying out the principles of the present invention a hitch construction for towing purposes is provided and is characterized by four standard-type ball-head hitching devices which lend themselves to practical use for hooking-up and towing not only wagons and trailers but farm implements too. THe construction shown features a reliably strong adaptation which minimizes the likelihood of bending, breaking or yielding in an undesirable manner due to stress and strain. Then, too, no tools are required to achieve the varying end results desired.

Briefly the herein disclosed invention pertains to structurally and functionally novel hitching and towing means characterized, generally stated, by a relatively stationary outer sleeve which constitutes a housing, the bore of said sleeve providing a bearing. Complemental mounting means is fixed atop the exterior of the sleeve and embodies a fixed upstanding screw-threaded anchoring stud having a stud securing nut thereon and which lends itself to attachment to and anchorage on a rear bumper of a truck, or attachment to a draft bar on an automobile or the like. There is also an inner relatively movable sleeve housed in said outer sleeve and journaled for rotation in the bearing. The inner sleeve has means at its respective leading and trailing ends or end portions cooperatively orienting and assembling both sleeves for coordinate use. In addition hitching means is operatively carried by the trailing end of the inner sleeve for hooking up and towing a trailer, wagon, farming implement, or the like.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 2 is a suitably enlarged view taken centrally on the plane of the section line 2—2 of FIG. 1 looking in the direction of the indicating arrows.

FIG. 4 is a view in perspective and fragmentarily shown and broadly similar to FIG. 1 but showing how a drawbar from an automobile or tractor is rigged for use in connection with the tow hitch construction; and FIG. 5 is an enlarged fragmentary cross section taken approximately on the plane of the section line 5—5 of FIG. 4.

Figure 1:
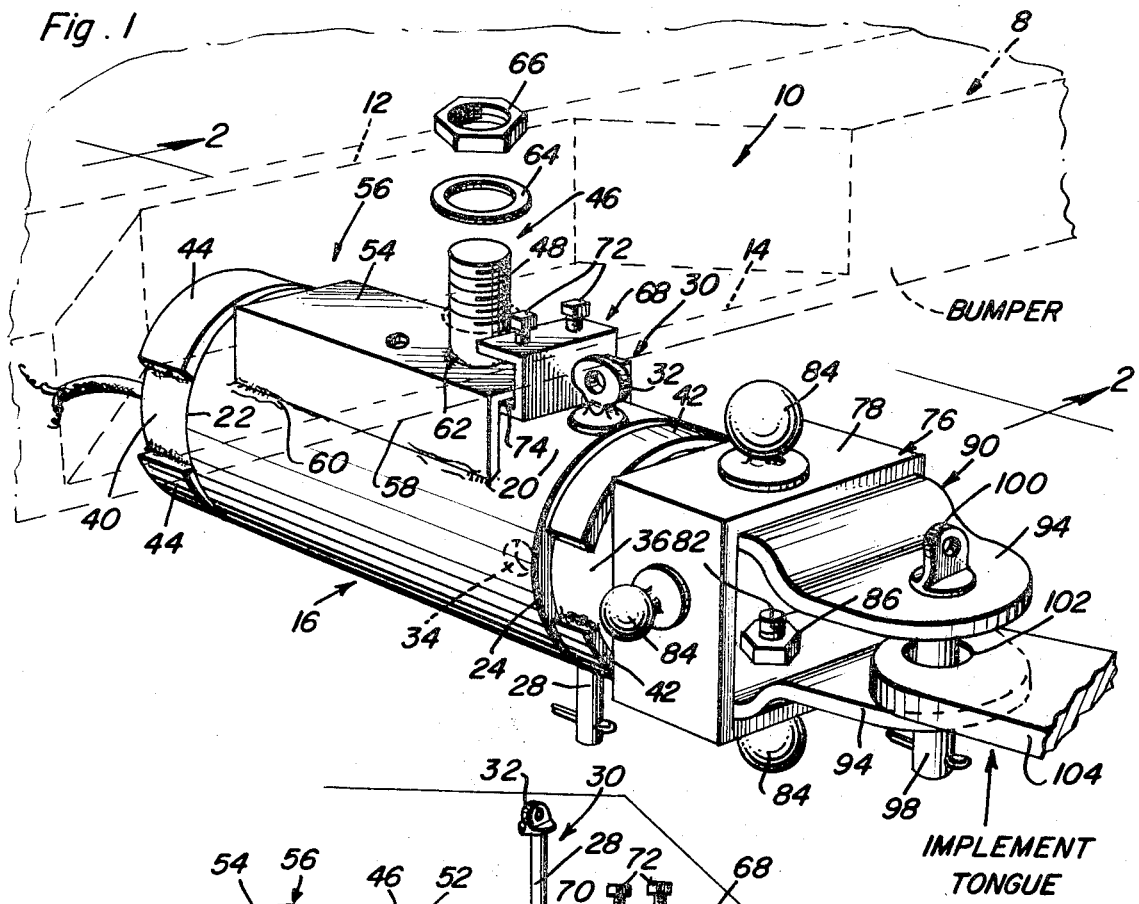
FIG. 1 is a view in perspective showing the improved tow hitch construction and how the mounting means thereon is operatively connectible with the horizontal shelf portion of a rear bumper (shown in phantom lines) of a type used on trucks and which also shows how an implement tongue is capable of operative connection therewith.
Figure 3:
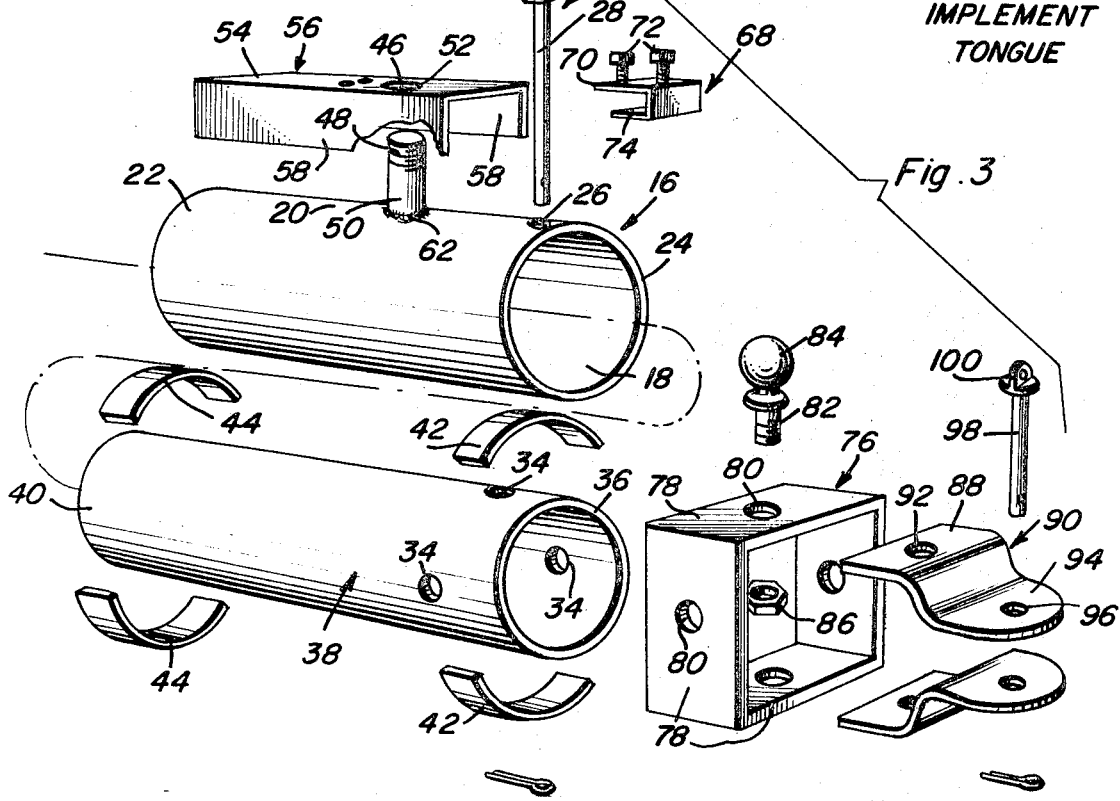
FIG. 3 is an exploded perspective view showing the individual component parts and the manner in which they are constructed and capable of being put together to provide the finished device appearing in FIG. 1.

With reference to the views of the drawing, it will be seen that the construction and arrangement of parts presented in FIGS. 1 to 3 inclusive on the one hand is slightly different from that shown in FIGS. 4 and 5. On the other hand the inner and outer sleeve construction is the same in all of the views and for this reason like reference numerals will be applied to like parts throughout all of the views. It can be kept in mind in this connection that FIGS. 1 and 2 in particular show the tow hitch construction rigged for use in association with the rear bumper 8 such as is used on well known small trucks. With particular reference to FIGS. 1 and 2 the bumper 8 is characterized by a recess 10 having a vertical surface 12 to which a license plate and source of illumination is connected (not detailed). This adaptation also embodies a horizontal shelf or ledge 14 which in practice is provided with a hole centrally arranged (not detailed).

The hitch construction as brought out in FIG. 3 in particular comprises an outer cylindrical sleeve 16 the bore 18 of which constitutes a housing and also a bearing. The upper peripheral surface portion of the sleeve is denoted at 20. The forward open end portion at the left in FIG. 3 is denoted at 22 and the rearward open end portion at 24. Forwardly of the end portion 24 there is a keeper pin hole 26 which serves to accommodate the shank or pin portion 28 of a manually insertable and removable keeper pin 30. This pin is provided at its upper end with a flanged head 32 and the pin proper is adapted to pass down through the hole 26 and through circumferentially spaced selectively usable keeper pin holes 34 provided in the rearward or terminal end portion 36 of the inner sleeve 38. Where necessary or advisable two diametrically opposite keeper pin holes 26 (FIGS. 1 and 2) may be provided. The sleeve 38 is of requisite diameter so that it fits snugly within the bearing 18 and the length of the sleeve is such that the end portions 36 and 40 project slightly beyond the ends 22 and 24 of the outer sleeve 16. These projecting end portions are provided with limit stop collars which are of sectional construction. The arcuate components or sections of the collar at the right in FIG. 3 are denoted at 42, these sections being welded or otherwise secured in place as suggested in FIG. 1 and providing limit stop shoulders. The similarly bent strap members 44 in FIG. 3 at the left provide a similar limit stop collar. The sectional collars are capable of abutting the coacting end portions 22 and 24 of the outer sleeve as evident in the assembled sleeve construction shown in FIG. 1. The mounting and attaching stud 46 has an upper screw-threaded end 48 and a lower end portion 50 which extends down through a hole 52 provided therefor in the web 54 of an inverted channel-shaped mount 56. More specifically the longitudinal side flanges 58 straddle the stud-anchoring surface portion 20 and are welded thereto as at 60 in FIG. 1 for example. With the channel-shaped mounting or member 56 in place and the stud also welded as at 62, the threaded end of the stud extends up through the hole provided in the shelf 14 to accommodate a washer 64 and an assembling and retaining nut 66. Thus the dual sleeve assembly is operatively connectible with the shelf 14, the web underlying the underneath side of the shelf 14. There is a stabilizing cleat at 68 and having a top flange 70 provided with setscrews 72 and a bottom flange 74 which hooks underneath the web 54. This adjustably attachable and detachable cleat stabilizes the connection between the stud-equipped mounting 56 and the aforementioned shelf 14.

The numeral 76 (FIG. 3) designates a substantially rectangular frame or adapter comprising flat component portions 78 at right angles to each other, each portion having a hole 80 therein to accommodate a screw-threaded shank 82 on one of the ball head hitches. These hitches are denoted by the numeral 84 and are structurally alike except that they vary in size and are selectively usable as is brought out in FIG. 1 for example. The shank portion is held in place by an assembling and retaining nut 86 which also serves to fasten in place the adjacent or coacting end portions 88 of the optionally usable clips 90. The apertured end portion 92 of each clip is secured on the shank 82 and held in place by the associated nut 86. The laterally offset ear portion 94 is provided with a keeper pin hole 96. These keeper pin holes can be lined up to accommodate the insertable and removable keeper pin 98 which, as will be noted, has a headed upper end 100. This pin is used with the ears of the clips in the manner shown in FIG. 1 to accommodate the apertured end portion 102 of the implement tongue 104. In the slight structural variation appearing in FIGS. 4 and 5, it will be noted that the device instead of being connected with the aforementioned bumper 8 is arranged to accommodate a drawbar 106 extending from an automobile or a tractor and generally referred to as a tractor (not shown) drawbar for hook-up purposes. The rounded terminal end portion 108 is provided with a hole 110 which fits over the stud 48. For stability an attachable and detachable hold-down bracket 112 is provided as shown in these two FIGS. 4 and 5. The hold-down bracket has an arched body portion 114 which straddles the adjacent or coacting portion of the drawbar, the laterally offset end portions 116 resting atop the web and being secured thereto by headed screw-threaded fasteners 118. It will be noted in FIG. 1 for example that the aforementioned web of the mounting channel 56 is provided with screw-threaded holes to accommodate the threaded shank portions of the attaching and retaining headed fasteners 118.

It is reiterated that FIGS. 1–3 show the invention with the component parts (see FIG. 3) assembled and readied for use and with the stud 46 anchored in place and held by the assembling and retaining nut 66. Thus the manner in which the specially constructed multipurpose device is used on a truck bumper 8 is brought out in the several FIGS. 1–3 inclusive. The manner in which the same construction is used alternatively in connection with a drawbar hook-up is brought out in FIGS. 4 and 5. Also the manner in which the implement tongue is used is brought out in FIGS. 1 and 2 in particular. It follows that the construction of the various parts and the manner in which the invention is used is clear from the views of the drawing. Therefore, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A hitch and towing means for use when operatively hitching and coupling
   1. a powered draft vehicle of one type or another, a truck or tractor to
   2. a drawn vehicle, a trailer, wagon, or farming implement for example:
      hitching and towing means comprising a relatively stationary outer sleeve constituting a housing, the bore of said sleeve providing a bearing, complemental mounting means for said outer sleeve fixed atop the exterior of said sleeve and embodying a fixed upstanding screw-threaded anchoring stud having a stud-securing nut thereon, an inner relatively movable sleeve housed in said outer sleeve and journaled for rotation in said bearing, said inner sleeve having assembling and retaining means at its respective leading and trailing end portions cooperatively orienting and assembling said sleeves, and hitching means operatively carried by the trailing end of said inner sleeve for hooking up and towing a trailer, wagon, farming implement, or the like, said hitching means comprising an adapter having encompassing portions surrounding and fixedly secured to a coacting trailing end portion of said inner sleeve and provided with securely mounted radially projecting individual ball-type hitches, said hitches being circumferentially spaced apart and each varying in size, being selectively usable and serving to accommodate and permit socket-equipped couplings provided on said trailer to be operatively coupled thereto.

2. The hitching means defined in and according to claim 1, said adapter comprising a non-circular frame having individual flat portions on which said ball-type hitches are removably and accessibly bolted in given positions, and rearwardly projecting clips carried by said frame, said clips having spaced parallel ears, said ears having aligned hitch-pin holes, and a hitch pin removably fitted in the coacting holes and adapted to permit an apertured pulling and towing tongue to be retentively connected to said ears and adapter.

3. A hitch and towing means for use when operatively coupling
   1. a powered draft vehicle of one type of another to
   2. a drawn vehicle, a trailer, wagon, or farming implement for example:
      hitching and towing means comprising a relatively stationary outer sleeve constituting a housing, the bore of said sleeve providing a bearing, an elongated inverted channel member having a web and longitudinal depending side flanges, said flanges being perched atop and welded lengthwise to a coacting upper peripheral surface of said outer sleeve, an upstanding stud affixed at a lower end to said peripheral surface, a median portion passing through a hole provided therefor in said web and an upper end which is screw-threaded to accommodate an anchoring nut, an inner relatively movable sleeve housed in the bore of said outer sleeve snug-fitted but journaled for manually turnable rotation in said bore in a manner that said bore provides a bearing for said inner sleeve, said inner sleeve being of a length longer than the outer sleeve and having its leading and trailing end portions projecting beyond corresponding open ends of said outer sleeve, said projecting end portions being surrounded by fixedly mounted stop collars which are adapted to abut the coacting ends of said outer sleeve, the trailing end of said inner sleeve being provided with a plurality of circumferentially spaced keeper pin holes, said outer sleeve being provided with a keeper pin hole with which said spaced keeper pin holes are adapted to be manually aligned in keeping with the needs at hand, a bodily insertable and removable keeper pin having a headed upper end, said pin being adapted to be passed downwardly through said keeper pin hole and a selected one of said spaced keeper pin holes, an adapter member surrounding and fixedly secured to a coacting trailing end of said inner sleeve and provided with securely mounted ball-head hitches which are spaced circumferentially apart and are progressively enlarged in diametral size and are accordingly selectively usable in a manner to permit socket-equipped couplings to be operatively coupled thereto.

4. The hitching means defined in and according to claim 3, said adapter member comprising a non-circular frame having individual flat portions on which said ball-type hitches are removably and accessibly bolted in given positions, and rearwardly projecting clips carried by said frame, said clips having spaced parallel ears, said ears having aligned hitch-pin holes, and a hitch pin removably fitted in the coacting holes and adapted to permit an apertured pulling and towing tongue to be retentively connected to said ears and adapter.

5. The hitching means defined in and according to claim 4, and wherein said web is provided at a place adjacent said stud with a pair of screw-threaded bracket fastening holes, and, in combination, a draft tongue hold-down bracket having a centralized arched portion to bridge over a portion of said tongue and offset end portions having screw-threaded headed fasteners which are designed and adapted to screw into said bracket fastening holes.

* * * * *